United States Patent

Van Zanten et al.

Patent Number: 5,141,294
Date of Patent: Aug. 25, 1992

[54] ANTI-SKID BRAKE CONTROL SYSTEM

[75] Inventors: Anton Van Zanten, Ditzingen; Friedrich Kost, Kornwestheim, both of Fed. Rep. of Germany

[73] Assignee: Robert Bosch GmbH, Stuttgart I, Fed. Rep. of Germany

[21] Appl. No.: 423,464

[22] PCT Filed: Feb. 23, 1988

[86] PCT No.: PCT/EP88/00130

§ 371 Date: Sep. 22, 1989

§ 102(e) Date: Sep. 22, 1989

[87] PCT Pub. No.: WO88/07466

PCT Pub. Date: Oct. 6, 1988

[30] Foreign Application Priority Data

Mar. 23, 1987 [DE] Fed. Rep. of Germany ....... 3709483

[51] Int. Cl.⁵ .................................................. B60T 8/68
[52] U.S. Cl. ...................................... 303/109; 303/100; 364/426.02
[58] Field of Search .................. 303/103, 104, DIG. 4, 303/109, 100, 108, 107, 109; 364/426.02, 426.03, 572, 724.14, 724.15

[56] References Cited

U.S. PATENT DOCUMENTS

| 3,508,795 | 4/1970 | Scharlack et al. | 303/104 |
|---|---|---|---|
| 3,904,251 | 9/1975 | Hikida et al. | 303/109 |
| 3,908,116 | 9/1975 | Bjornsen | 364/572 X |
| 3,967,862 | 7/1976 | Hunter et al. | 303/20 X |
| 4,309,060 | 1/1982 | Leiber et al. | 303/106 |
| 4,679,866 | 7/1987 | van Zanten et al. | 364/426.02 X |
| 4,715,662 | 12/1987 | van Zanten et al. | 303/100 X |
| 4,764,871 | 8/1988 | van Zanten | 180/179 X |
| 4,862,368 | 8/1989 | Kost et al. | 303/100 X |
| 4,932,726 | 6/1990 | Iwata et al. | 364/426.02 X |

FOREIGN PATENT DOCUMENTS 2204092 8/1976 Fed. Rep. of Germany .
1018548 1/1966 United Kingdom .

Primary Examiner—Douglas C. Butler
Assistant Examiner—Josie A. Ballato
Attorney, Agent, or Firm—Felfe & Lynch

[57] ABSTRACT

An anti-skid brake control system for a motor vehicle includes at least one sensor for determining the deceleration $\dot{V}_R$ of a vehicle wheel, a device for determining the deceleration $\dot{V}_F$ of the vehicle, a device for determining the difference D of the vehicle and wheel decelerations ($D = \dot{V}_F - \dot{V}_R$), a control circuit responsive to the difference D for producing brake pressure control signals, and a brake pressure control device for increasing and decreasing the given brake pressure in response to the control signals from the control circuit. The difference D is also supplied to a ladder filter. During phases in which brake pressure is maintained at a constant level, the ladder filter is switched to identification by the control circuit and determines a reflection coefficient. The control signals then affect the brake pressure so as to select a slippage value on a stable branch of the $\mu$ slippage curve and near its maximum is derived from the distance of the reflection coefficient from the value "1".

4 Claims, 1 Drawing Sheet

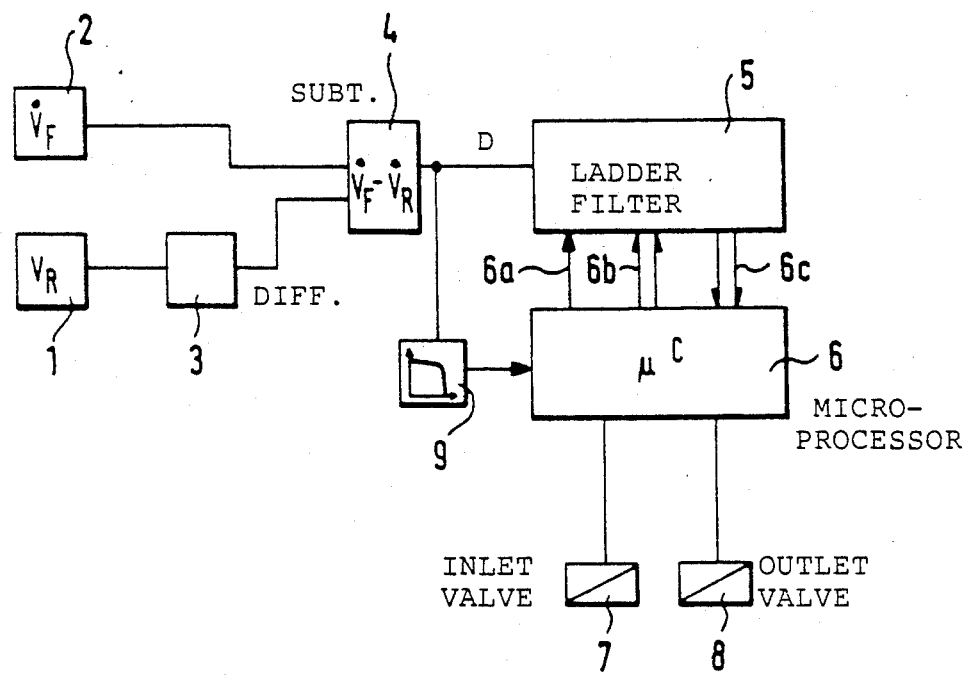

ANTI-SKID BRAKE CONTROL SYSTEM

BACKGROUND OF THE INVENTION

The invention relates to an anti-skid brake control system.

As it can be noted from the publication AT Z 71 (1969/issue 6, pages 181-189, esp. p. 184), the use of the difference D between vehicle deceleration and wheel deceleration as a control value in an anti-skid brake control system has already been realized. However, this type of control has not proven itself.

During braking under anti-skid conditions it is of significant importance to identify at what point in time the wheel slippage exceeds the maximum of the $\mu$ slippage curve. If the identification is made too late it is possible that the pressure in the wheel brake cylinder is not reduced fast enough so as to prevent a locking of the wheel. The earlier this identification is made the earlier the pressure can be reduced. An early identification permits maintaining a low difference between actual slippage and maximum permissible slippage than does an identification at a later point. Numerous external conditions, however, such as uneven roads and similar road conditions complicate the exact identification of when the wheel speed falls below the instability limit (i.e. the wheel speed which belongs to the maximum of the tire slippage curve). The wheel speed measure is therefore usually filtered first and after being filtered used for determining the instability.

A further aid to timely identify instability would be means to predict instability. This can be achieved by estimating the stability reserve.

If the wheel slippage is smaller than the one belonging to the maximum of the wheel slippage curve the wheel is within the range of stability of the slippage curve. Provided the slippage is within the stability range of the slippage curve, the difference between the actual tire slippage and the tire slippage which belongs to the maximum of the $\mu$ slippage curve is subsequently referred to as the stability reserve. The greater the difference is, the greater is the stability reserve. The greater the stability reserve is, the greater is the difference between the present wheel brake pressure and the wheel brake pressure which belongs to the maximum of the slippage curve. On the other hand, the smaller the stability reserve is, the closer is the wheel brake pressure to the pressure which corresponds to the maximum of the wheel slippage curve.

As noted above in addition to the wheel brake pressure the wheel is also affected by factors such as uneven roads and other interfering conditions. If the wheel slippage is within the range of stability of the slippage curve, far away from the instability limit (i.e. there is a great stability reserve) these interferences lead to smaller wheel slippage changes than when the stability reserve is small. Hence, the interferences of the wheel provide information regarding the stability reserve. The faster the wheel slippage change caused by an interference approaches normal values again the greater is the stability reserve.

SUMMARY OF THE INVENTION

It is an object of the invention to provide an anti-skid brake control system which can identify the distance of the nominal slippage from the maximum of the present $\mu$ slippage curve and hence, has the possibility to continuously put the nominal value close to the maximum of the $\mu$ slippage curve, on the left side of the maximum, that is.

The wheel interferences can be quantified by modelling and identifying the wheel-tire-road system as a linear auto-regressive process (AR-process). It is characteristic for stable AR-processes that the stationary or average value of the output is zero.

It is a prerequisite for this model that only interferences trigger this process during identification while the initial condition does not have to be zero. During identification the wheel brake pressure should be at a constant value by approximation.

Preferably, the identification should begin shortly after the sudden pressure change; at a point when the difference deceleration D is at a maximum.

From the parameters of the AR-model it can then be determined whether the wheel-tire-road system is stable or unstable. Further, a value for the stability reserve can be derived.

Since the wheel-tire-road system is non-linear, and the AR-model is, linear, the identification must cover only a limited period of time. Furthermore, it proved that the modelling of the difference deceleration D yields better results than the modelling of the difference between vehicle speed and wheel speed.

Based on the difference deceleration D in accordance with the invention the identification uses the difference between the wheel deceleration and the vehicle deceleration as a measure.

It is assumed that the vehicle deceleration is available by means of measuring or estimation.

The AR-process is modelled as a normalized or unnormalized ladder filter. The identification determines the reflection coefficients. The ladder filter has a great number of advantageous properties, among others, that the stability of the AR-process can be directly read from the reflection coefficients. When a reflection coefficient approaches the value 1 the AR-process approaches the instability limit. When the reflection coefficient reaches the value 1 or is greater the AR-process is unstable. The difference between the value of the greatest reflection coefficient and 1 is hence a value for the stability reserve of the wheel-tire-road system. Moreover, the normalized ladder filter has additional advantages, among others, the calculations involved are reduced and all variables are standardized to 1.

The ladder filter forms the exact estimation of the AR-process according to the method of least squares. Any additional filtering, as previously mentioned, is not required.

BRIEF DESCRIPTION OF THE DRAWING

The sole FIGURE is a diagrammatic representation of the inventive ABS.

DETAILED DESCRIPTION OF THE PREFERRED EMBODIMENT

A sensor 1 is provided to determine the Wheel speed $V_R$ and a sensor 2 is provided to measure the vehicle deceleration $\dot{V}_F$. As already mentioned the vehicle deceleration $\dot{V}_F$ can also be determined by other methods.

After differentiation of the wheel speed in a differentiator 3 the difference $D = \dot{V}_F - \dot{V}_R$ is formed in a substractor 4. The difference D is then supplied to a ladder filter 5.

This filter is connected with a control device 6, such as a microprocessor, via a control line 6a and via data lines 6b and 6c. Finally, a valve combination including an inlet valve 7 and an outlet valve 8 is connected to the microprocessor 6; it is known that such a valve combination permits increasing the brake pressure, maintaining the brake pressure at a constant level and reducing the brake pressure. The microprocessor 6 is connected to the output of the subtractor 4 via a low-pass filter 9.

The microprocessor 6 controls the ladder filter 5. The initial signal for identification of when the wheel slippage will exceed the maximum of the slippage curve is supplied via line 6a to the ladder filter 5. This is carried out, for example, at the beginning of a pressure maintaining phase in the wheel brake cylinder. If necessary, the ladder filter is initialized via line 6b, that is, at the beginning the ladder filter is given certain initial values for the reflection coefficients and for the covariance.

The identification is interrupted when the microprocessor 6 sends a stop signal to the ladder filter via line 6a. Such a signal can be sent out at the end of a pressure maintaining phase, for example.

During the identification the microprocessor can, via line 6c, take over the values of the reflection coefficients and the covariance which are also calculated in the ladder filter. This permits a continuous monitoring of the ladder filter for stability reserve. During monitoring the covariance can be used as a determining or deciding factor. If the AR process is stable then the stationary value at the output 6c is zero. The covariance is then a value for straying of the initial value around the value zero. If the AR-process is unstable then there is no stationary value at the output; this means the average initial value increases and hence the covariance also increases. Conversely, if the covariance is great in this case the AR-process is unstable. Since the value of the covariance is also dependent on the extent of the interferences, a characterization of the stability based on the value of the covariance is somewhat problematic. A certain minimum number of measures is required to determine the reflection coefficient. When the wheel is very unstable, the stability identification will be carried out, due to the reflection coefficients, only when the wheel slippage is great. The covariance, however, increases immediately and it is therefore essential to include the covariance in the stability identification. The covariance is used to generate the control signals when it surpasses a threshold.

Based on the reflection coefficients and the stability reserve which were determined the valve 7/8 can now be controlled. If the stability reserve is great the pressure is increased; if the stability reserve is small the pressure is maintained at a constant level and if the stability reserve approaches zero or is negative the pressure is reduced.

There is no identification required when the wheel deceleration is smaller than the vehicle deceleration over a longer period of time, for example after pressure is reduced when the tire slippage goes back in the stable range of the stability curve. In order to identify such situations in the microprocessor 6 the difference deceleration D is filtered with a low-pass filter 9. When the output of the low-pass filter surpasses a certain threshold point prescribed in the microprocessor then an identification is not required.

The adaptive ladder filters, especially the normalized ladder filters can very easily be configured as VLSI modules since the structure thereof is recursive. The low-pass filter can also be configured as a VLSI module or be implemented in the microprocessor.

The algorithms for the normalized and unnormalized ladder filters are set forth below. The algorithm for the low-pass filter is well known in the art.

Algorithm for the Normalized Ladder Filter

Assume $Y_T$ to be the signal available at the input of the ladder filter at a time T (i.e. the difference acceleration VRAD-VFZ [VWHEEL−VVEHICLE]). Assume T=0 when the parameter estimation starts.

The following parameter can be freely selected as required:
$n_{max}$: (maximum filter arrangement)
$\lambda$: (neglecting factor, with $0 < \lambda < 1$)
$\tau$: (initial covariance)
Also calculated are:
$R_T$: (the covariance estimation at a point T)
$\rho_{n,T}$: (the n-th reflection coefficient at a time T)
When the algorithm is initialized at the time T=0 assume the following:

$$R_0 = \tau + Y_0^2$$

$$v_{0,0} = \eta_{0,0} = Y_0 \cdot R_0^{-\frac{1}{2}}$$

$$\rho_{1,0} = 0, \rho_{2,0} = 0, \ldots, \rho_{n_{max},0} = 0$$

For the subsequent times T=1, T=2, ... until the parameter estimation is interrupted assume the following:

$$R_T = \lambda \cdot R_{T-1} + Y_T^2$$

$$v_{0,T} = \eta_{0,T} = Y_T \cdot R_T^{-\frac{1}{2}}$$

For n=0 to $[\min\{T, n_{max}\} - 1]$ calculate $$\rho_{n+1,T} = \rho_{n+1,T-1} \cdot (1 - v_{n,T}^2)^{\frac{1}{2}} \cdot (1 - \eta_{n,T-1}^2)^{\frac{1}{2}} + v_{n,T} \cdot \eta_{n,T-1}$$

$$v_{n+1,T} = [v_{n,T} - \rho_{n+1,T} \eta_{n,T-1}] \cdot (1 - \rho_{n+1,T})^{-\frac{1}{2}} \cdot (1 - \eta_{n,T-1}^2)^{-\frac{1}{2}}$$

$$\eta_{n+1,T} = [\eta_{n,T-1} - \rho_{n+1,T} v_{n,T}] \cdot (1 - \rho_{n+1,T}^2)^{-\frac{1}{2}} \cdot (1 - v_{n,T}^2)^{-\frac{1}{2}}$$

Algorithm for the Unnormalized Ladder Filter

Assume $Y_T$ to be the signal available at the input of the filter at the time T (i.e. the difference acceleration VRAD-VFZ [VWHEEL−VVEHICLE]). Assume T=0 when the parameter estimation starts.

As required, the following parameters can be freely selected.
$n_{max}$: (maximum filter arrangement)
$\lambda$: (neglecting factor, with $0 < \lambda \leq 1$)
$\tau$: (initial covariance)
Also calculated are:
$\Delta_{n,T}$: (correlation)
$R_{n,T}^\epsilon$: (forward covariance)
$R_{n,T}^r$: (backward covariance)
$K_{n,T}^\epsilon$: (forward reflection coefficient)
$K_{n,T}^r$: (backward reflection coefficient)
When the algorithm is initialized at a time T=0 assume the following:

$$R_{0,0}^\epsilon = Y_0^2 + \tau$$

$$R_{0,0}^r = Y_0^2 + \tau$$

$$\epsilon_{0,0} = Y_0$$

$r_{0,0} = Y_0$ $\Delta_{1,0} = 0, \Delta_{2,0} = 0, \ldots \Delta_{n_{max},0} = 0$ For the subsequent times $T=1$, $T=2$ until the parameter estimation is interrupted assume the following:

$\epsilon_{0,T} = Y_T$ $r_{0,T} = Y_T$ $\gamma_{1,T} = 0$ $R_{0,T}^\epsilon = \lambda R_{0,T-1}^\epsilon + Y_T^2$ $R_{0,T}^r = \lambda R_{0,T-1}^r + Y_T^2$ and continuing:
For $n=0$ to $[\min\{T, n_{max}\} - 1]$ calculate $$\Delta_{n+1,T} = \lambda \cdot \Delta_{n+1,T-1} + \frac{r_{n,T-1} \cdot \epsilon_{n,T}}{1 - \gamma_{n,T}}$$

$\gamma_{n,T} = \gamma_{n-1,T} + (R_{n,T}^r)^{-1} \cdot r_{n,T}^2$ $K_{n+1,T}^\epsilon = \Delta_{n+1,T}(R_{n,T}^\epsilon)^{-1}$ $K_{n+1,T}^r = \Delta_{n+1,T}(R_{n,T}^r)^{-1}$ $\epsilon_{n+1,T} = \epsilon_{n,T} - K_{n+1,T}^r \cdot r_{n,T-1}$ $r_{n+1,T} = r_{n,T-1} - K_{n+1,T}^\epsilon \cdot \epsilon_{n,T}$ $R_{n+1,T}^\epsilon = R_{n,T}^\epsilon - \Delta_{n+1,T}^2 \cdot (R_{n,T-1}^r)^{-1}$ only if $T < n_{max}$ $R_{n+1,T}^r = R_{n,T-1}^r - \Delta_{n+1,T}^2 \cdot (R_{n,T}^\epsilon)^{-1}$ $R_{n+1,T}^\epsilon = \lambda R_{n+1,T-1}^\epsilon + \epsilon_{n+1,T}^2 \cdot (1 - \gamma_{n,T})^{-1}$ only if $T \geq n_{max}$ $R_{n+1,T}^r = \lambda R_{n+1,T-1}^r + r_{n-1,T}^2 \cdot (1 - \gamma_{n,T})^{-1}$ There has thus been shown and described a novel anti-skid brake control system which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention which is limited only by the claims which follow.

What is claimed is:

1. Antiskid brake control system for a motor vehicle having wheels, said wheels during braking exhibiting slippage characterized by a $\mu$-slippage curve having a stable portion, an unstable portion, and a limit therebetween, said system comprising
   means for determining the deceleration $\dot{V}_R$ of a wheel,
   means for determining the deceleration $\dot{V}_F$ of the vehicle,
   means for determining the difference $D = \dot{V}_F - \dot{V}_R$,
   brake pressure control means which receives brake pressure control signals for increasing brake pressure, maintaining brake pressure constant, and reducing brake pressure,
   a ladder filter which receives the difference D and uses the difference D to determine reflection coefficients during periods when brake pressure is maintained constant, and
   a control circuit which receives the difference D and uses the difference D to generate said brake pressure control signals for said brake pressure control means, said control circuit providing a signal to said ladder filter to cause determination of said reflection coefficients when said brake pressure is maintained constant, said control circuit receiving said reflection coefficients and generating control signals which effect a slippage on the stable portion of the $\mu$-slippage curve and close to the limit from the distance of the highest reflection coefficient from a value of 1.

2. Antiskid brake control system as in claim 1 wherein said ladder filter also determines covariance, said control circuit using said covariance to generate said control signals when said covariance surpasses a threshold.

3. Antiskid brake control system as in claim 1 further comprising a low pass filter which filters the difference D, reception of said difference D by said control circuit being interrupted when said difference D surpasses a threshold of said filter, whereby generation of said reflection coefficients by said ladder filter is interrupted.

4. Antiskid brake control system as in claim 1 wherein said ladder filter is a normalized ladder filter.

* * * * *